US012218548B2

(12) United States Patent
Matsubara et al.

(10) Patent No.: US 12,218,548 B2
(45) Date of Patent: Feb. 4, 2025

(54) EMBEDDED MAGNET ROTOR AND ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Masakatsu Matsubara, Mie Mie (JP); Masaru Kano, Yokkaichi Mie (JP); Daisuke Yamagishi, Yokkaichi Mie (JP); Naoya Sasaki, Nagoya Aichi (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 227 days.

(21) Appl. No.: 18/064,033

(22) Filed: Dec. 9, 2022

(65) Prior Publication Data
US 2023/0318373 A1 Oct. 5, 2023

Related U.S. Application Data

(63) Continuation of application No. PCT/JP2022/015396, filed on Mar. 29, 2022.

(51) Int. Cl.
*H02K 1/276* (2022.01)

(52) U.S. Cl.
CPC ......... *H02K 1/276* (2013.01); *H02K 2213/03* (2013.01)

(58) Field of Classification Search
CPC ......... H02K 1/27; H02K 1/276; H02K 1/2766
See application file for complete search history.

(56) References Cited

U.S. PATENT DOCUMENTS

| 4,327,302 | A * | 4/1982 | Hershberger | ........ H02K 1/2766 |
| | | | | 310/156.56 |
| 6,768,238 | B2 * | 7/2004 | Knauff | ................. H02K 1/2773 |
| | | | | 310/156.55 |
| 7,385,328 | B2 * | 6/2008 | Melfi | ..................... H02K 29/03 |
| | | | | 310/156.53 |
| 9,088,190 | B2 * | 7/2015 | Tremelling | .............. H02K 1/28 |

(Continued)

FOREIGN PATENT DOCUMENTS

| JP | 2005-130604 A | 5/2005 |
| JP | 5447418 B2 | 3/2014 |

(Continued)

*Primary Examiner* — Tran N Nguyen
(74) *Attorney, Agent, or Firm* — Finnegan, Henderson, Farabow, Garrett & Dunner, LLP

(57) ABSTRACT

According to an embodiment, an embedded magnet rotor comprises: a rotor shaft, a rotor core having permanent magnet housing spaces; and flat plate-shaped permanent magnets. Permanent magnet housing spaces each extend more radially outward than a position where the permanent magnet is held by a magnet holding outer projection and each have a communication opening communicating with a gap space. A radial thickness of each of the two chips sandwiching the communication opening and a circumferential width of the communication opening are in such a dimensional relation as to prevent a fragment produced by break of the permanent magnet from protruding from the communication opening and coming into contact with the stator.

4 Claims, 5 Drawing Sheets

(56) References Cited

U.S. PATENT DOCUMENTS 9,680,341 B2 * 6/2017 Takeda ..................... H02K 1/28
2012/0248915 A1 10/2012 Kagami et al.

FOREIGN PATENT DOCUMENTS

| JP | 2014-64422 A | 4/2014 |
| JP | 2015-195638 A | 11/2015 |
| JP | 2015-202027 A | 11/2015 |

* cited by examiner

EMBEDDED MAGNET ROTOR AND ROTARY ELECTRIC MACHINE

CROSS-REFERENCE TO RELATED APPLICATIONS

This application is a continuation of prior International Application No. PCT/JP2022/015396, filed on Mar. 29, 2022; the entire contents of all of which are incorporated herein by reference.

FIELD

The present invention relates to an embedded magnet rotor and a rotary electric machine including the same.

BACKGROUND

In a rotary electric machine including an embedded magnet rotor, permanent magnets are housed in through holes formed in regions near a radially outer side in a rotor core and extending in the axial direction. Typically, the through holes each have not only a space where to house the permanent magnet but also a partial space on its radially outer side. The partial space on the radially outer side is a flux barrier for hindering the passage of a magnetic flux.

In many cases, top bridges which are part of the rotor core are present between the partial spaces on the radially outer side and the outer surface of the rotor core to strengthen the structure of the rotor core.

The top bridges serve as paths of the fluxes, that is, magnetic paths. The fluxes that pass through the magnetic paths become leakage fluxes that stay only inside the rotor side and are not linked with the stator side, leading to low torque efficiency of the rotary electric machine.

With this as a background, some rotors used are of a type having no top bridges and having the aforesaid partial spaces on the radially outer side communicate with a space outside the rotor core (a gap space between the rotor and the stator).

Though achieving a reduction in leakage fluxes as described above, the embedded magnet rotor with no top bridges requires some measure being taken in case the magnet breaks when an abnormality occurs such as when the rotation speed abnormally increases. Specifically, when any one of the magnets is fragmented, the fragment may protrude into the gap space outside the rotor core through the partial space on the radially outer side.

The protrusion of the fragment of the magnet into the gap space, if any, causes a problem that the fragment is caught between the rotor and the stator to lock the rotor, which may break the outer surface of the rotor or the inner surface of the stator.

DETAILED DESCRIPTION

An object of the present invention is to provide an embedded magnet rotor and a rotary electric machine in which a fragment of a permanent magnet does not protrude into a gap space even if the permanent magnet is broken.

According to the present invention, there is provided an embedded magnet rotor comprising: a rotor shaft extending in a rotation axis direction; a rotor core disposed on a radially outer side of the rotor shaft, the rotor core having a plurality of permanent magnet housing spaces formed at near radially outer part of the rotor core with circumferential intervals; and flat plate-shaped permanent magnets respectively housed in the plurality of permanent magnet housing spaces, wherein the permanent magnet housing spaces each extend more radially outward than a range where the permanent magnet is held by a magnet holding outer projection formed in the rotor core and each have a communication opening communicating with a gap space between the embedded magnet rotor and a stator arranged on a radially outer side of the embedded magnet rotor, wherein the communication opening is sandwiched by two chips being part of the rotor core and extending in a circumferential direction, and wherein in a cross section perpendicular to the rotation axis direction, a radial thickness of each of the two chips and a circumferential width of the communication opening are in such a dimensional relation as to prevent a fragment produced when the permanent magnet breaks from protruding from the communication opening and coming into contact with the stator.

According to the present invention, there is provided a rotary electric machine comprising: the embedded magnet rotor; and a stator disposed on a radially outer side of the rotor core.

Hereinafter, with reference to the accompanying drawings, embodiments of an embedded magnet rotor and a rotary electric machine of the present invention will be described. The same or similar portions are represented by the same reference symbols, and a duplicate description will be omitted.

Figure 1:
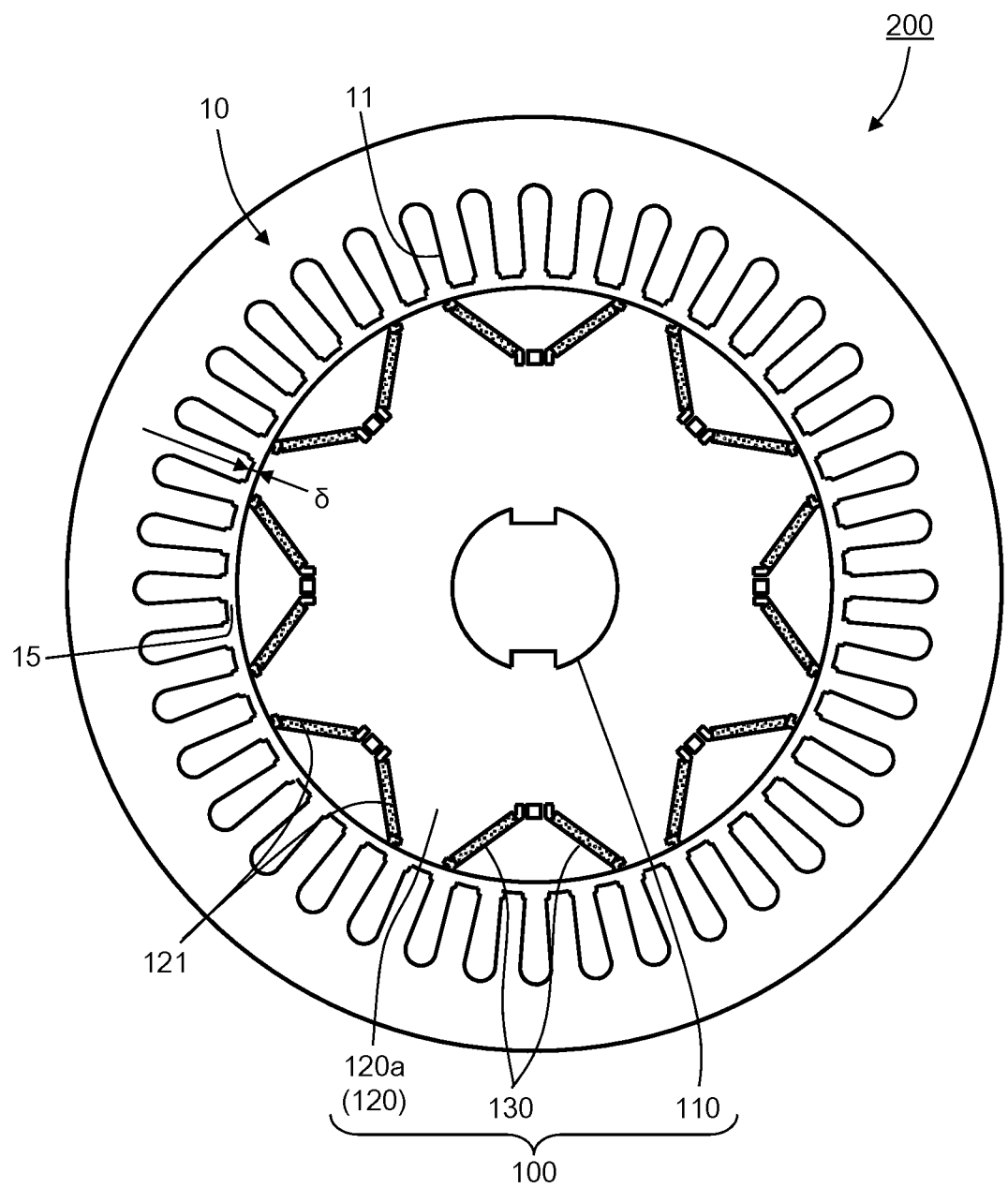
FIG. 1 is a cross-sectional view illustrating the structure of a rotary electric machine according to an embodiment.

FIG. 1 is a cross-sectional view illustrating the structure of a rotary electric machine 200 according to an embodiment.

The rotary electric machine 200 includes: an embedded magnet rotor 100 having a rotor shaft 110 extending in the rotation axis direction, a rotor core 120 attached to the rotor shaft 110, and a plurality of permanent magnets 130; a cylindrical stator 10 disposed on a radially outer side of the rotor core 120 to surround the rotor core 120 across a gap space 15; and two bearings (not illustrated) to rotatably support the rotor shaft 110.

The rotor core 120 has a plurality of electromagnetic steel sheets 120a laminated in the rotation axis direction. The electromagnetic steel sheets 120a each have a punched portion where the rotor shaft 110 is to penetrate and punched portions where the permanent magnets 130 are to penetrate. In the state in which the electromagnetic steel sheets 120a are laminated, these punched portions form, in the rotor core 120, through holes extending in the rotation axis direction. It should be noted that though FIG. 1 illustrates, as an example, the case where the rotor core 120 has the electromagnetic steel sheets 120a, this is not restrictive and is also applicable to a solid rotor in which a rotor shaft and a rotor core are integrated.

The permanent magnets 130 are flat plate-shaped. At each magnetic pole, two permanent magnet housing spaces 121 for housing the respective two permanent magnets 130 are arranged in a V-shape projecting radially inward. It should be noted that though FIG. 1 illustrates, as an example, the case where the permanent magnets 130 are arranged in the V-shape, this is not restrictive and such arrangement without the V-shape is applicable to a case where the arrangement has a problem of the protrusion of a fragment.

On the inner periphery of the stator 10, a plurality of stator teeth 11 for a stator winding (not illustrated) are formed at intervals in the circumferential direction.

Here, the radial width of the gap space 15 is represented by the symbol "δ".

Specifically, the radial width δ of the gap space 15 is an interval between the outer peripheral surface of the rotor core 120 and an inner circumferential envelope surface of the stator 10, that is, a radially inner top of the stator tooth 11.

Figure 2:
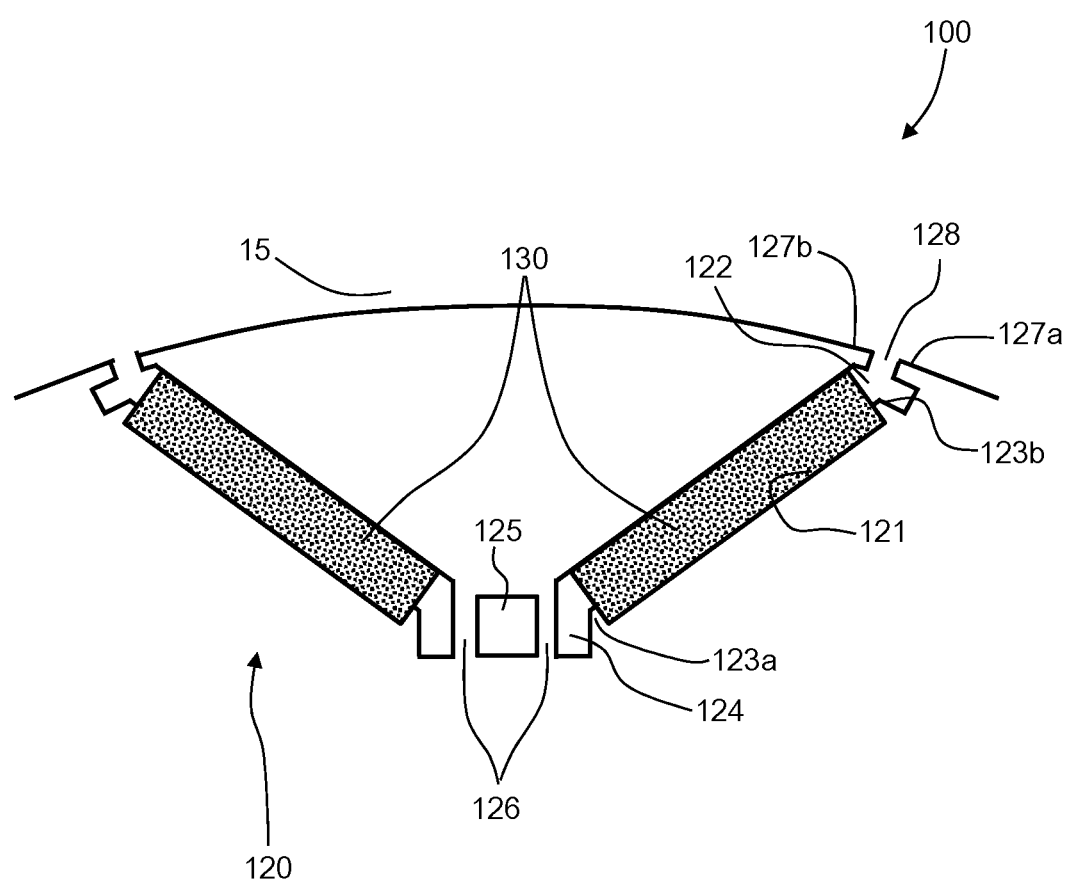
FIG. 2 is a partial cross-sectional view illustrating the configuration of one magnetic pole portion of an embedded magnet rotor of the embodiment.

FIG. 2 is a partial cross-sectional view illustrating the configuration of one magnetic pole portion of the embedded magnet rotor 100 according to the embodiment.

An area sandwiched by radially inner ends of the two permanent magnet housing spaces 121 forming the V-shape functions as a center bridge 126 that connects portions, in the rotor core 120, located on a radially outer side and a radially inner side of the two permanent magnet housing spaces 121. It should be noted that though there is a center flux barrier 125 in the middle of the center bridge 126 in FIG. 2, the center flux barrier 125 is not essential.

The permanent magnet housing spaces 121 each have, in addition to a portion where to house the permanent magnet 130, a partial space that is located on a radially outer side of the permanent magnet 130.

Specifically, the permanent magnet housing spaces 121 each have an outer partial space 122 that is a portion located on a more radially outer side than the permanent magnet 130, that is, a portion on a side far from the center bridge 126. The outer partial spaces 122 communicate with the gap space 15 through communication openings 128.

The communication openings 128 are each sandwiched by two chips 127a and 127b forming part of the outer peripheral surface of the rotor core 120.

In each of the permanent magnet housing spaces 121, a magnet holding outer projection 123b in a projecting shape, which is part of the rotor core 120, is formed between the permanent magnet 130 and the outer partial space 122 to resist a centrifugal force applied to the permanent magnet 130 during the rotation of the embedded magnet rotor 100. The magnet holding outer projections 123b are each formed on a radial-direction inner surface of the permanent magnet housing space 121.

The permanent magnet housing spaces 121 each further have an inner partial space 124 that is a portion on a more radially inner side than the permanent magnet 130, that is, a portion close to the center bridge 126.

Figure 3:
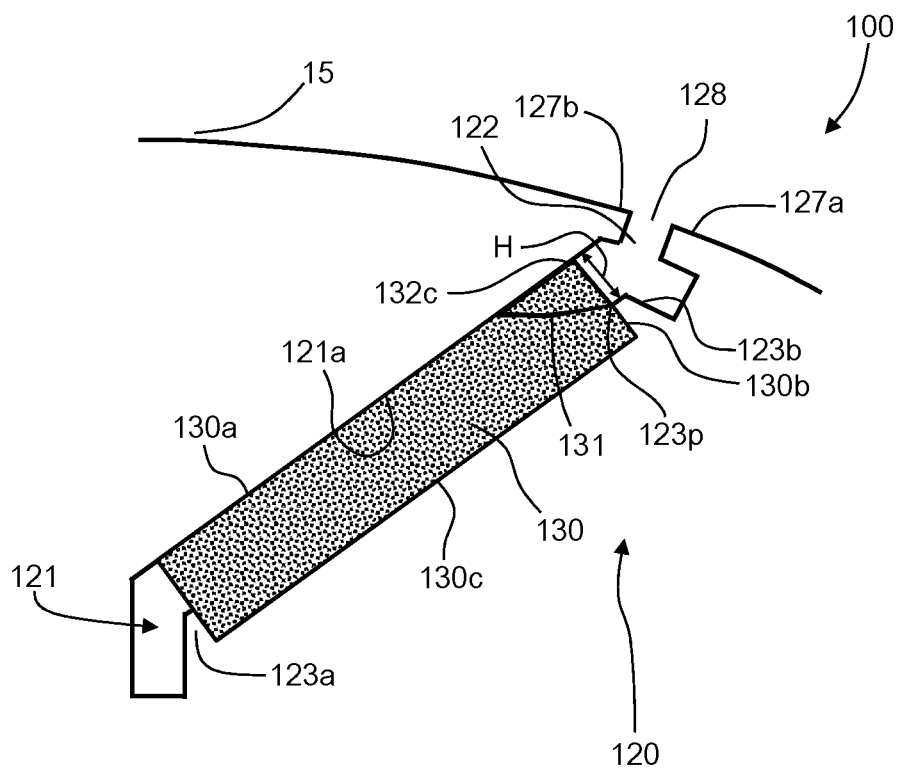
FIG. 3 is a partial cross-sectional view illustrating an example of breakage of one permanent magnet of the embedded magnet rotor according to the embodiment.

FIG. 3 is a partial cross-sectional view illustrating an example of breakage of one of the permanent magnets 130 of the embedded magnet rotor 100 according to the embodiment.

While the embedded magnet rotor 100 is rotating, the centrifugal force applied to the permanent magnet 130 is received by a radial-direction outer wall 121a of the permanent magnet housing space 121 and the magnet holding outer projection 123b.

There is no projection on the radial-direction outer wall 121a with which a radial-direction outer side surface 130a of the permanent magnet 130 is in contact.

As indicated in FIG. 3, an interval between a tip of the magnet holding outer projection 123b and the radial-direction outer wall 121a is represented by the symbol "H".

A radially outer end surface 130b of the permanent magnet 130 is in contact with the magnet holding outer projection 123b at its portion close to a radial-direction inner side surface 130c of the permanent magnet 130, and nothing is in contact with its other portion, that is, its portion corresponding to the length H. The tip of the magnet holding outer projection 123b is in contact with a tip contact portion 123p of the radially outer end surface 130b of the permanent magnet 130. Then, stress concentration occurs at the tip contact portion 123p.

Therefore, the tip contact portion 123p is highly likely to be a starting point of the occurrence of a defect of the permanent magnet 130. Further, in the radially outer end surface 130b of the permanent magnet 130, the portion held by the magnet holding outer projection 123b suffers a compressive stress but another portion not held by the magnet holding outer projection 123b is given a radially outward load due to the centrifugal force. As a result, in the defect starting from the tip contact portion 123p, a tensile stress component in a direction along the radially outer end surface 130b of the permanent magnet 130 is generated. This tensile stress component will be a cause making the defect starting from the tip contact portion 123p develop as a crack 131 toward the inside of the permanent magnet 130.

Because of the above, the crack 131 propagates toward the radially inner side of a radially outer corner portion 132c of the permanent magnet 130.

Figure 4:
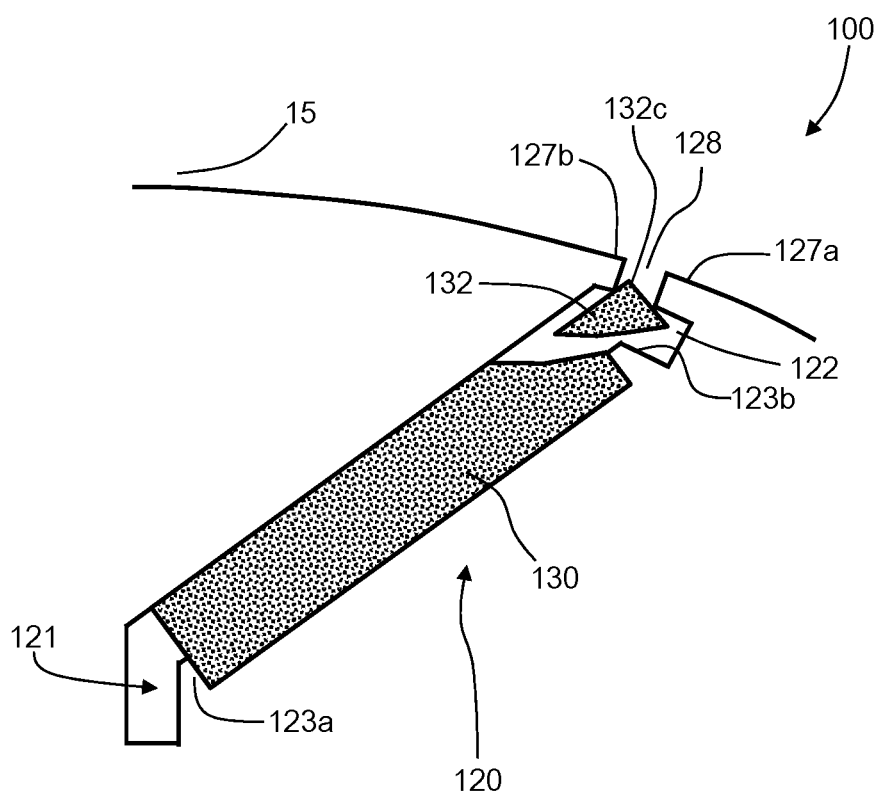
FIG. 4 is a partial cross-sectional view illustrating the state of a fragment in the case of the example of the breakage of the one permanent magnet of the embedded magnet rotor according to the embodiment.

FIG. 4 is a partial cross-sectional view illustrating the state of a fragment 132 in the case of the example of the breakage of the one permanent magnet 130 of the embedded magnet rotor 100 according to the embodiment.

The penetration of the crack 131 illustrated in FIG. 3 through the permanent magnet 130 results in the production of the fragment 132. Since the crack 131 develops toward the radially inner side of the radially outer corner portion 132c of the permanent magnet 130 as described above, the radially outer corner portion 132c remains in the fragment 132.

Further, in the embedded magnet rotor 100, the fragment 132 is supposed to move while the radially outer corner portion 132c is on the radially outer side, because of the direction of the centrifugal force applied to the fragment 132.

That is, this is supposed to be a state in which the portion of the radially outer end surface 130b and the portion of the radial-direction outer side surface 130a are constrained respectively by the chip 127a and the chip 127b and the radially outer corner portion 132c is present in the communication opening 128.

Figure 5:
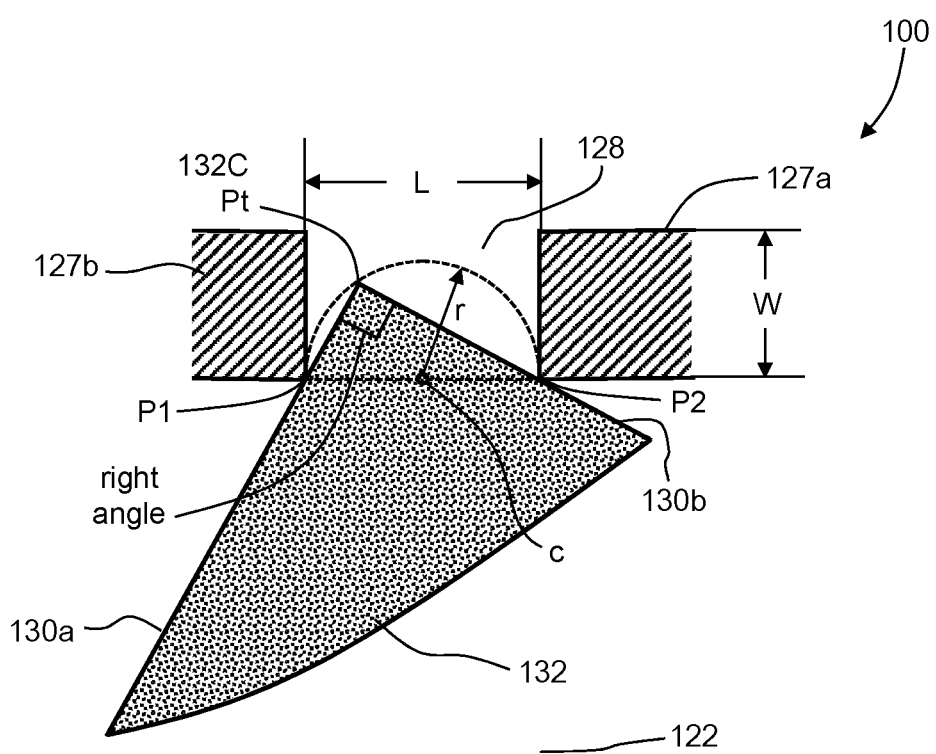
FIG. 5 is an enlarged view of the vicinity of a communication opening in FIG. 4 illustrating the state of the fragment in the case of the example of the breakage of the one permanent magnet of the embedded magnet rotor according to the embodiment.

FIG. 5 is an enlarged view of the vicinity of the communication opening 128 in FIG. 4 illustrating the state of the fragment 132 in the case of the example of the breakage of the one permanent magnet 130 of the embedded magnet rotor 100 according to the embodiment.

The fragment 132 is protruding into the communication opening 128 from the inside of the outer partial space 122.

In this state, the radial-direction outer side surface 130a of the fragment 132 is in contact with an inner corner portion of the chip 127b at P1 and the radially outer end surface 130b of the fragment 132 is in contact with an inner corner portion of the chip 127a at P2.

In the cross section in FIG. 5 perpendicular to the extension direction of the rotation axis of the rotor shaft 110, point Pt being the radially outer corner portion 132c of the fragment 132, point P1, and point P2 form a right triangle. Therefore, the trajectory of point Pt is a semicircle whose diameter is an interval between point P1 and point P2, that is, the width L of the communication opening 128, as illustrated in FIG. 5. Here, the radius r is ½ of the diameter L.

The width L of the communication opening 128 needs to have a dimension more than or equal to twice the thickness T of the electromagnet steel sheet 120a, considering manufacturing constrains.

It follows that in the case where the radius r is smaller than the thickness W of the chip 127a and the chip 127b, the radial-direction outer side surface 130a of the fragment 132 does not protrude from the outer peripheral surface of the embedded magnet rotor 100.

Based on the above, the embedded magnet rotor 100 according to the embodiment satisfies the conditions of the following expression (1) and expression (2) regarding the outer partial space 122 of the permanent magnet housing space 121.

$$2 \cdot T = < L < H \tag{1}$$

$$L/2 - W < \delta \tag{2}$$

Here, "H" stands for the interval, illustrated in FIG. 3, between the tip of the magnet holding outer projection 123b and the radial-direction outer wall 121a, "L" stands for the width of the communication opening, "W" stands for the radial thickness of each of the two chips, "T" stands for the sheet thickness of each of the electromagnetic steel sheets 120a, and "δ" stands for the radial width of the gap space 15. Note that "X=<Y" indicates that X is equal to or less than Y.

In the case where the fragment 132 is inclined with respect to the rotation axis direction, in FIG. 5, the angle of the radially outer corner portion 132c of the fragment 132 in the plan view of FIG. 5 is larger than 90 degrees, and thus the aforesaid expression (1) is satisfied with a larger margin.

Therefore, satisfying the conditions of expression (1) and expression (2), the embedded magnet rotor 100 according to this embodiment is configured to prevent the fragment 132 of the permanent magnet 130 from protruding into the gap space 15.

As described above, according to the present embodiment, it is possible to provide the embedded magnet rotor and the rotary electric machine in which the fragment of the permanent magnet does not protrude into the gap space even if the permanent magnet breaks.

Other Embodiments

While embodiment of the present invention has been described, the embodiment has been presented by way of example only, and is not intended to limit the scope of the invention. Features of the embodiment may be used in combination. Furthermore, the embodiment may be embodied in other various forms. Various omissions, replacements and changes may be made without departing from the spirit of the invention. The embodiment and variants thereof are within the scope and spirit of the invention, and are similarly within the scope of the invention defined in the appended claims and the range of equivalency thereof.

What is claimed is:

1. An embedded magnet rotor comprising:
a rotor shaft extending in a rotation axis direction;
a rotor core disposed on a radially outer side of the rotor shaft, the rotor core having a plurality of permanent magnet housing spaces formed at near radially outer part of the rotor core with circumferential intervals; and
flat plate-shaped permanent magnets respectively housed in the plurality of permanent magnet housing spaces,
wherein each of the permanent magnet housing spaces extends more radially outward than a range of space that the permanent magnet is held by a magnet holding outer projection formed in the rotor core and each of the permanent magnet housing spaces has a communication opening that communicating with a gap space between the embedded magnet rotor and a stator arranged on a radially outer side of the embedded magnet rotor,
wherein the communication opening is sandwiched by two chips being part of the rotor core and extending in a circumferential direction, and
wherein in a cross section perpendicular to the rotation axis direction, a radial thickness of each of the two chips and a circumferential width of the communication opening are in such a dimensional relation as to prevent a fragment produced when the permanent magnet breaks from protruding through from the communication opening and coming into contact with the stator.

2. The embedded magnet rotor according to claim 1, wherein the rotor core has a plurality of laminated electromagnetic steel sheets, and
wherein the dimensional relation satisfies the following expression (1) and expression (2), $$2 \cdot T = < L < H \tag{1}$$

$$L/2 - W < \delta \tag{2},$$

where "H" stands for an interval between a tip of the magnet holding outer projection and a radial-direction outer wall of the permanent magnet housing space facing the magnet holding outer projection, "L" stands for the width of the communication opening, "W" stands for the radial thickness of each of the two chips, "T" stands for a sheet thickness of each of the electromagnetic steel sheets, "δ" stands for a radial width of the gap space, and "X=<Y" indicates that X is equal to or less than Y.

3. The embedded magnet rotor according to claim 1, wherein the plurality of permanent magnet housing spaces are arranged in pairs, and at each pole portion, each of the pairs is arranged in a V-shape projecting radially inward.

4. A rotary electric machine comprising:
the embedded magnet rotor according to claim 1; and
a stator disposed on a radially outer side of the rotor core.

* * * * *